United States Patent [19]

Vogel

[11] Patent Number: 4,602,144
[45] Date of Patent: Jul. 22, 1986

[54] TEMPERATURE CONTROLLED SOLDER EXTRACTOR ELECTRICALLY HEATED TIP ASSEMBLY

[75] Inventor: Alan D. Vogel, Columbia, Md.

[73] Assignee: PACE Incorporated, Laurel, Md.

[21] Appl. No.: 651,769

[22] Filed: Sep. 18, 1984

[51] Int. Cl.[4] ............................ B23K 3/04; H05B 1/02
[52] U.S. Cl. .................................. 219/230; 219/238; 219/241; 228/20; 228/53
[58] Field of Search .................... 219/227, 229-231, 219/236-241; 228/19, 20, 51-55

[56] References Cited

U.S. PATENT DOCUMENTS

| 748,571 | 1/1904 | Ayer | 219/238 |
| 2,064,645 | 12/1936 | Abbott | 219/229 |
| 3,392,897 | 7/1968 | Siegel | 219/229 X |
| 3,410,472 | 11/1968 | Weller et al. | 219/241 X |
| 3,485,417 | 12/1969 | Cocks | 219/230 X |
| 4,328,920 | 5/1982 | Vella | 219/230 |
| 4,435,636 | 3/1984 | Roystom | 219/238 X |

FOREIGN PATENT DOCUMENTS 2713846  1/1978  Fed. Rep. of Germany ...... 219/241

Primary Examiner—A. Bartis
Attorney, Agent, or Firm—Gerald J. Ferguson, Jr.; James E. Bryan; Michael P. Hoffman

[57] ABSTRACT

An improved solder extractor has a tip temperature sensor coaxially disposed about the hollow tubular tip forward of the electric heat generating assembly into the which the tip is inserted and thermally insulated therefrom. The tip is held within the heat generating assembly by a plurality of springs formed as angular sections of a hollow cylinder which are symmetrically disposed about the tip between the tip and the heat generating element. The tip is also provided with a chamfered end which mates with a corresponding chamfer on a detent within the heat generating assembly to form a vacuum seal with a source of vacuum.

16 Claims, 17 Drawing Figures

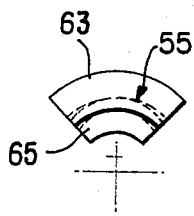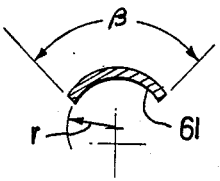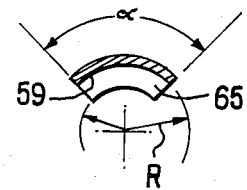
FIG. 5    FIG. 6    FIG. 7    FIG. 8
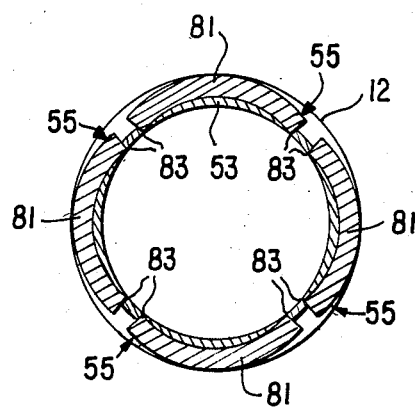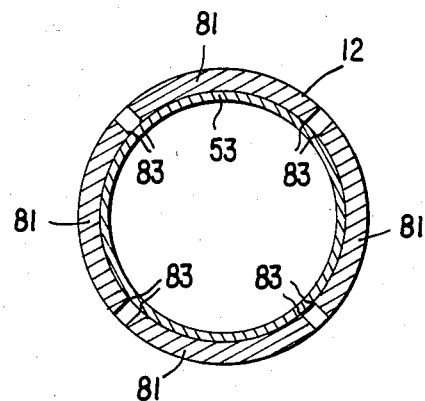
FIG. 9A    FIG. 9B
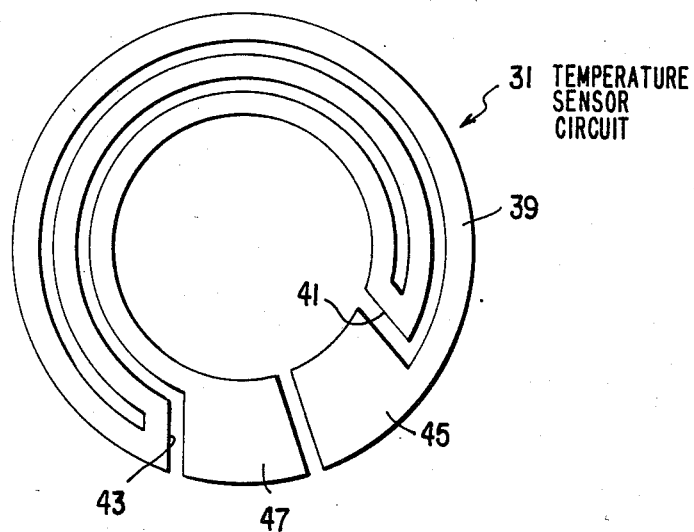
FIG. 10

TEMPERATURE CONTROLLED SOLDER EXTRACTOR ELECTRICALLY HEATED TIP ASSEMBLY

BACKGROUND OF THE INVENTION

1. Field Of The Invention

The present invention relates to improvements to solder extractors and to the tips utilized therein.

2. Description Of The Prior Art

The repair of electronic equipment often involves the need to remove solder fillets and joints efficiently without otherwise affecting the circuit as a whole or the components therein. Generally speaking, solder extraction is performed by applying the front end of a heated tubular element to a soldered area to melt the solder. Suction is then applied to the rear end of the tubular element to draw the molten solder off into the tube.

Siegel, U.S. Pat. No. 3,392,897, discloses a solder extractor comprising a coaxial instrument of pencil-type construction in which a tubular heated tip, a heat generating element, a molten solder receiving chamber and a gripping handle are all disposed in concentric and/or axial succession with respect to one another, with an axial passageway front to rear for the flow of extracted solder. The tubular heated tip is replaceable since the tip will become worn, due to the corrosive action of the solder, and/or will become burdened with solder after prolonged usage. To facilitate ready replacement of the tip, the tip is generally formed as a tubular member which is receivable within the axial passage through the heating element and held in place by a transverse set screw bearing on one side of the tip. Moreover, to maintain a low fabrication cost, the tips are not closely toleranced with respect to the axial passage but are merely made small enough to readily fit into the axial passage, bearing in mind that there will be variations in the dimensions of the axial passage between different extractors.

However, while these measures maintain the tip as a low cost item, they also create problems with the operation of the extractor. In particular, the utilization of a set screw to hold the tip in place may result in the tip being forced to one side of the axial passage through the heating element. This displacement has two detrimental effects, it impairs heat transfer to the tip because of limited contact with the inner surface of the axial passage through the heating element (e.g., in the worst case, the tip may only make a line contact with the heating element) and the gap between the tip and the heating element allows loss of vacuum pressure (for drawing molten solder through the tip).

Vella, U.S. Pat. No. 4,328,290, also discloses a solder extractor which may utilize a set screw to hold the hollow tip in place. More particularly, the Vella patent discloses a control system for temperature control of the tip wherein the temperature of the heating element is monitored and the power supply to the heating element is controlled in response to the measured temperature of the heating element in order to maintain a predetermined temperature. However, such a control system presupposes adequate thermal contact between the tip and the heating element and, as previously noted, a set screw mount for the tip in the heating element does not insure consistent or adequate thermal contact.

SUMMARY OF THE INVENTION

It is an object of the present invention to provide a solder extractor having improved control of the tip temperature.

It is a further object of the present invention to provide a solder extractor having improved thermal contact between the tip and the heat generating element.

It is another object of the present invention to provide an improved replaceable tip for a solder extractor having a vacuum seal.

In one embodiment, the present invention provides a solder extractor comprising a heat generating element having an axis and an axial passageway therethrough. A hollow tubular desoldering tip is coaxially, heat conductively received within the axial passageway and extends forwardly therefrom. A temperature sensing detector for detecting the temperature of the tip is located forwardly of and spaced apart from the heat generating element. An insulator is disposed intermediate the temperature detector and the heat generating element for inhibiting heat transfer from the heat generating element to the detector.

In another embodiment, the present invention provides a solder extractor comprising a heat generating assembly having an axis and an axial passageway therethrough. A hollow tubular desoldering tip is coaxially received within the axial passageway and extends forwardly therefrom. At least one resilient member is disposed intermediate the hollow tubular desoldering tip and the heat generating element. The resilient member heat conductively connects the heat generating element and the tip, and generates a frictional force to inhibit relative movement between the heat generating element and the tip.

In a further embodiment, the present invention provides a replaceable tip for a solder extractor including a heat generating assembly having an axis and an axial passageway therethrough. The axial passageway is coaxially receivable of the tip and is provided with a detent for limiting the extent to which the tip may be inserted into the passageway. The detent also has an axial passageway therethrough which communicates with a vacuum source for applying a vacuum to the passage to draw molten solder therethrough. The tip is formed as a hollow tubular member having a first portion heat conductively receivable within the axial passageway through the heat generating assembly and a second portion which extends forwardly therefrom. The first portion, at the free end thereof, is provided with a vacuum seal which engages the detent in a substantially air-tight seal, whereby when a vacuum is applied to the passageway through the detent substantially no leakage occur between the outer periphery of the tip and the inner surface of the heat generating assembly.

BRIEF DESCRIPTION OF THE DRAWINGS

FIG. 5 is a front end view of a resilient member according to the present invention.

FIG. 6 is a sectional view, taken along line 6—6 of FIG. 4, of a resilient member according to the present invention.

FIG. 7 is a sectional view, taken along line 7—7 of FIG. 4, of a resilient member according to the present invention.

FIG. 8 is a sectional view, taken along line 8—8 of FIG. 4, of a resilient member according to the present invention.

FIGS. 9A and 9B are sectional views illustrating the operational principle of the resilient member of the present invention. FIG. 9A showing partial insertion of the tip into the heat generating assembly and FIG. 9B showing complete insertion.

FIG. 10 is a plan view of the temperature sensing circuit of the present invention.

DETAILED DESCRIPTION OF THE INVENTION

Hand-held, pencil-like solder extractors are known in the art. Typically, such solder extractors comprise a replaceable tubular heated tip, a heat generating assembly for supplying heat to the tip, a molten solder receiving chamber and a gripping handle disposed in concentric and/or axial succession one to the other, with an axial passageway front to rear for the flow of extracted solder. In use, the operator applies the hot tip to a soldered connection long enough to melt the solder, then initiates a blast of suction which draws the now molten solder up through the tip, along the axial passageway, and into the solder receiving chamber. In this regard, Siegel, U.S. Pat. No. 3,392,897, discloses such conventional solder extractors and the use thereof, the disclosure of which is hereby incorporated by reference.

Figure 1:
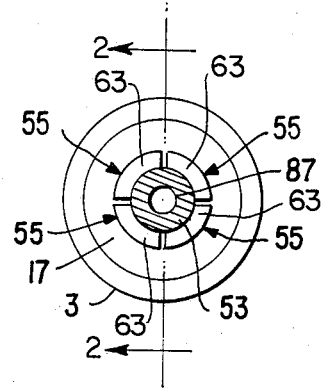
FIG. 1 is a front view of the heat generating assembly of a solder extractor according to the present invention.
Figure 3:
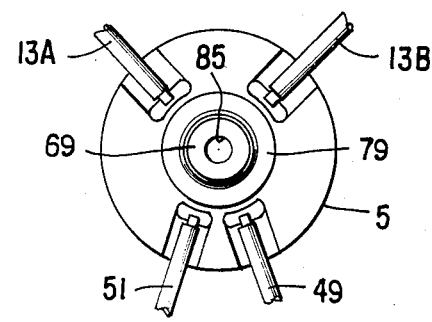
FIG. 3 is a rear view of the heat generating assembly of a solder extractor according to the present invention.
Figure 2:
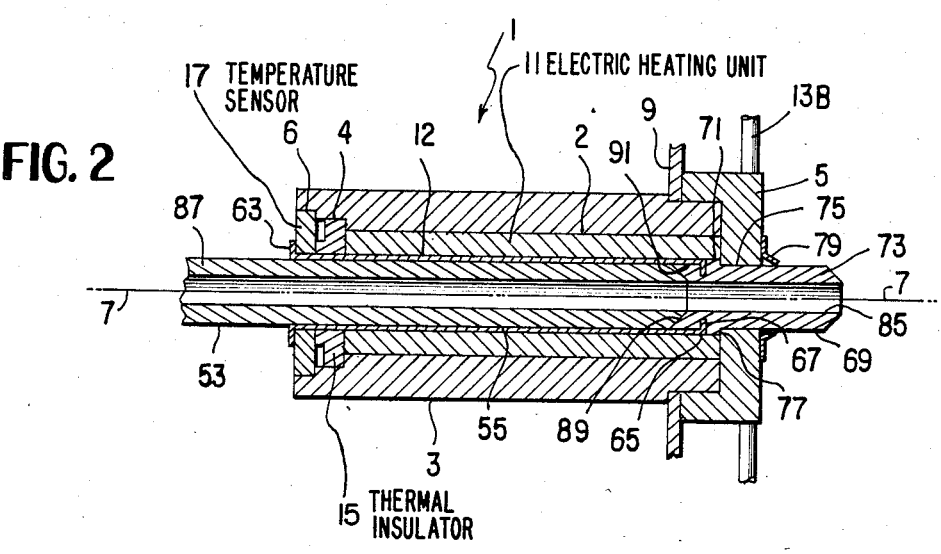
FIG. 2 is a sectional view, taken along line 2—2 of FIG. 1, of the heat generating assembly of a solder extractor according to the present invention.

Turning to the drawing figures, FIGS. 1, 2 and 3 illustrate front, sectional and rear views of the heat generating assembly of a solder extractor according to the present invention. In particular, the heat generating assembly, generally indicated at 1, comprises tubular outer shell 3 having one end closed by an end cap 5. The tubular outer shell 3 has an axial bore 2 therethrough which widens in two discrete steps at the other end, thereby forming a first annular portion 4 and a second annular portion 6. The tubular outer shell 3 and the end cap 5 are coaxially disposed about a common axis (indicated by dot-dash line A—A). A flange 9 (only a portion of which is shown) is connected to the outer tubular shell 3 and/or end cap 5 and extends perpendicular to the common axis A—A. This flange 9 is utilized to secure the heat generating assembly 1 to the handle portion (not shown) of the solder extractor. Within the tubular outer shell 3, there is coaxially disposed therewith a tubular heat generating element 11. Suitably, the heat generating element 11 comprises a tubular ceramic core composed of, for example, alumina, having an axial bore 12 therethrough and having a resistance heating wire (not shown) wrapped thereabout. Preferably, the resistance heating wire is cemented to the ceramic core. Suitable resistance heating wires are known in the art, for example, Nichrome wires (80–20 nickel-chrome alloys). Preferably, the heat generating element 11 will produce about 30 watts @ 18 volts, although higher or lower voltages can be used, as well as elements which produce a greater or lesser wattage. The heat generating element 11 is connected to an electric power supply (not shown) by heater leads 13A and 13B which pass through end cap 5. The heat generating element 11 extends from the end cap 5 to the first annular portion 4. A thermal insulator 15 is disposed within the first annular portion 4 and a temperature sensor 17 is disposed within the second annular portion 6.

Figure 15:
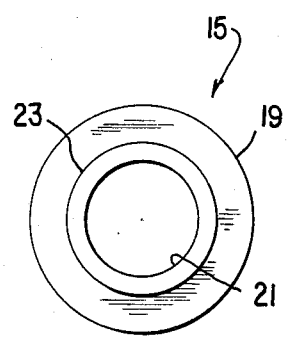
FIGS. 15 and 16 are front and side views, respectively, of the thermal spacer according to the present invention.
Figure 16:
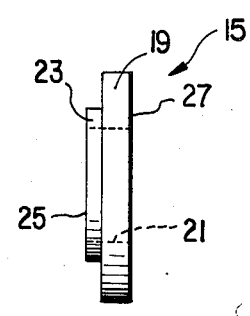

As may best be seen in FIGS. 15 and 16, the thermal insulator 15 comprises an annular disc 19 having a central bore 21 therethrough which corresponds to the axial bore 12 through the heat generating element 11. A flange portion 23 extends axially of the annular disc 19 about the periphery of the central bore 21. The face 25 of the flange portion 23 abuts the temperature sensor 17 and the face 27 of the annular disc 19 abuts the heat generating element. The thermal insulator 15 is composed of a ceramic material having a high resistance to heat transfer, e.g., steatite. Additionally, by decreasing the cross-sectional area across the insulator, i.e. the face 25 of the flange portion 23 has a smaller area than the face 27 of the annular disc 19, the heat transfer surface of the insulator in contact with the temperature sensor 17 is decreased, thereby decreasing conductive heat transfer to the sensor 17 through thermal insulator 15.

Figure 11:
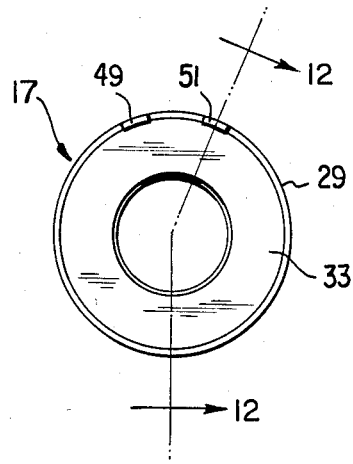
FIG. 11 is a rear view of the temperature sensor according to the present invention.
Figure 12:
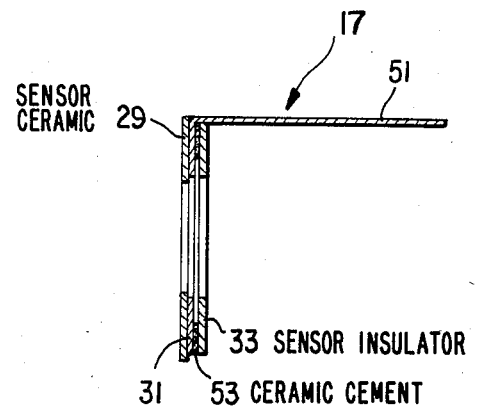
FIG. 12 is a sectional view, taken along line 12—12 of FIG. 11, of the temperature sensor according to the present invention.
Figure 13:
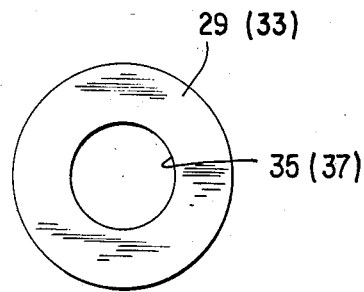
FIGS. 13 and 14 are front and side views, respectively, of the sensor ceramic/insulator according to the present invention.
Figure 14:
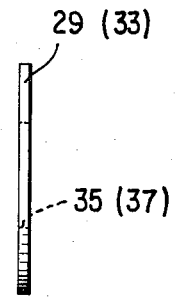

As may best be seen in FIGS. 10–14, the temperature sensor 17 comprises a sensor ceramic 29, a sensor circuit 31, and sensor insulator 33. The sensor ceramic 29 and the sensor insulator 33 are both formed as annular discs having central bores, 35 and 37, respectively, therethrough. The central bores, 35 and 37, correspond to the axial bore 12 through the heat generating element 11. The sensor ceramic 29 is preferably formed of alumina, and the sensor insulator 33 is preferably formed of steatite. In a preferred embodiment, the outer diameter of the sensor ceramic 29 is larger than that of the sensor insulator 33 and the inner diameter of the sensor ceramic 29 is less than that of the sensor insulator 33. The sensor circuit 31 (as best seen in FIG. 10) is of a substantially annular disc shape formed by a substantially flat linear element 39 with serpentine bends 41 and 43. The free ends 45 and 47 of the linear element 39 are formed as enlarged areas for contact with sensor leads 49 and 51 (as shown in FIGS. 11 and 12). The linear element 39 is a variable resistance material (electrical resistance varying with temperature), preferably a nickel-iron alloy (BALCO ®) having increasing electrical resistance with increasing temperature.

The sensor ceramic 29 is cemented to the sensor circuit 31 by a ceramic cement (not shown) and the sensor circuit 31 is in turn cemented to the sensor insulator 33 by ceramic cement 53. The sensor leads 49 and 51 are attached to the free ends 45 and 47 of the linear element 39 of the sensor circuit 31 as by resistance welding. The leads, preferably nickel, pass through apertures (not shown) in the heat generating assembly 1 and out through the end cap 5. These sensor leads are connected to a power supply and control system for controlling the input of electrical power to the heat generating element 11 through heater leads 13A and 13B. Such a power supply and control system is disclosed in Vella, U.S. Pat. No. 4,328,920, the disclosure of which is incorporated herein by reference. In general, however, temperature sensor 17 will detect the temperature of the tip 53 and the electrical power supplied to heat generating element 11 by the power supply and control system (not shown) will be controlled to maintain a predetermined tip temperature. By mounting the sensor 17 coaxially about the tip 53, forward of the heat generating element 11 and separated therefrom by insulator 15, a more accurate temperature determination is provided with respect to the actual tip temperature.

Figure 4:
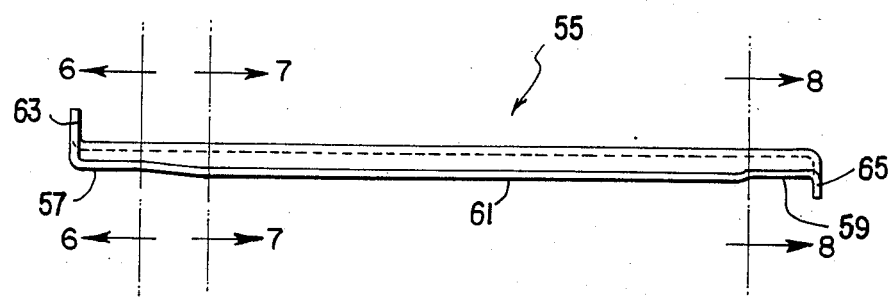
FIG. 4 is a side view of a resilient member according to the present invention.

The tip 53 is held within the heat generating assembly 1 by a resilient retention means comprising a plurality of springs 55 which are symmetrically disposed about the tip. As shown in FIG. 1, four springs 55 are symmetrically disposed about tip 53 between the tip 53 and the heat generating element 11. As best seen in FIGS. 4≅8, each spring 55 is formed as an angular sector of a hollow cylinder of uniform thickness "t". The angular sector includes a first longitudinal section 57 having a radius of curvature "R" substantially equal to one-half the outside diameter of the tip 53; a second longitudinal section 59 having a radius of curvature "R" substantially equal to one-half the outside diameter of the tip 53; and a third longitudinal section 61 having a radius of curvature "r" less than one-half the diameter of the tip 53 ("R">"r"). A first flange portion 63 extends upwardly from the free end of the first longitudinal section 57. A second flange portion 65 extends downwardly from the free end of the second longitudinal section 59. The first flange portion 63 abuts against the front face, i.e. the temperature sensor 17, of the heat generating assembly 1. The second flange portion 65 is received within an annular groove 67 formed in spring retainer 69. Spring retainer 69 is formed as a tubular plug having three portions. A first portion, adjacent the tip 53, has a diameter substantially equal to the diameter of the tip 53. This first portion and annular groove 67 accept longitudinal portion 59 and flange portion 65, respectively, of spring 55 to hold the spring 55 parallel to the axial bore 12 when tip 53 is removed. A second portion 71 has a diameter substantially equal to the diameter of the axial bore 12 and a third portion 73 has a lesser diameter than the second portion 71 and passes through aperture 75 in end cap 5. The different diameter portions, 71 and 73, form a shoulder 77 between them which is held against the interior of end cap 5 by retention spring 79. Thus, the springs 55 are prevented from axial movement with respect to the axial bore 12 through the heating element 11 by the first flange portion 63 abutting against the temperature sensor and the second flange portion 65 trapped in the annular groove 67 of the spring retainer 69.

As previously noted, the springs 55 are formed as angular sections of hollow cylinders and are symmetrically disposed about the tip 53. Thus, if three springs are used, the angle α will be about 120°; if four springs are used, the angle α will be about 90°; etc. The angle α being the angle of the angular section of a hollow cylinder defining the spring 55, in the first and second longitudinal sections, 57 and 59, where the radius of curvature "R" is substantially equal to one-half the outside diameter of the tip 53. The angle α defining the angle of the angular section of the hollow cylinder in the third longitudinal section 61 may be equal to the angle α, but, preferably is slightly larger. For example, when the angle α is about 90°, the angle α is preferably about 108°. This allows for a tight retention of the tip 53 within the heat generating element 11.

As shown in FIG. 9A, as a tip 53 is inserted into the axial bore 12 in the heat generating element 11, the springs 55, i.e. the third longitudinal section, are arched inwardly from the axial bore, with a line contact 81 between the springs 55 and the axial bore 12 and the free ends 83 of the springs 55 are spaced inwardly from the axial bore 12. As shown in FIG. 9B, after the tip 53 is inserted in the axial bore 12, the free ends 83 of the springs 55 are bent backward, due to the resiliency of the springs 55, into contact with the axial bore 12. The resiliency of the springs 55 tends to cause the springs to exert a force on the outer periphery of the tip 53, thereby frictionally holding the tip in place. Desirably, the springs 55 are formed of a metal alloy which will effectively conduct heat from the heat generating element 11 to the tip and which will not lose its resiliency with prolonged heating and/or repeated heating and cooling, e.g., a chromium-nickel alloy such as hardened Inconel 718.

By utilization of the springs 55, good heat conductive contact between the heating element 11 and the tip 53 is assured even if there are variations in the diameter of the tips 53 utilized in the solder extractor. In the best case, as shown in FIG. 9B, the springs 55 will tightly abut both the heat generating element 11 and the tip 53 over their entire outer and inner peripheries. In the worst case (not shown), four line contacts 81 between the springs 55 and the heat generating element 11 will occur and eight line contacts between the free ends 83 of the springs 55 and the outer periphery of the tip 53 will occur (this being far superior, even in the worst case, to the potential single line contact formed with a set screw retaining mechanism).

The spring retainer 69 has an axial bore 85 therethrough which communicates with a solder receiving chamber (not shown) and a vacuum source (also not shown) for drawing molten solder through the apparatus. A corresponding axial bore 87 through the tip 53 aligns with the axial bore 85 through the spring retainer 69 for smooth flow of solder therethrough. The spring retainer 69 is provided with a chamber 89 on the free end of the first plug portion 71 thereof and a corresponding chamber 91 is formed on the end of the tip 53 inserted into the axial bore 12 of the heat generating element 11. The tip 53 is inserted into the axial bore 12 until chamber 91 tightly abuts against the mating chamber 89, thus, the spring retainer 69 acts as a detent to limit the length of the tip 53 which can be inserted into the heat generating element 11. Moreover, the mating chambers, 89 and 91, form a vacuum seal whereby when suction (from the vacuum source) is applied to axial bore 85, the suction applied to the axial bore 87 in tip 53 is not diminished by any by-passing occurring at the juncture of tip 53 and spring retainer 69.

What is claimed is:

1. In a solder extractor comprising an elongated heat generating element having a longitudinal axis, a forward end, a rearward end and an axial passageway therethrough extending along said longitudinal axis and a hollow tubular dissoldering tip coaxially heat conductively received within said axial passageway and extending forwardly from said forward end, the improvement comprising temperature sensing means, mounted in heat exchange relation with said tip, for detecting the temperature of said tip, said temperature sensing means located forwardly of and spaced apart from said heat generating element;

thermal insulation means, intermediate said temperature sensing means and said heat generating element, for inhibiting heat transfer from said heat generating element to said temperature sensing means.

2. The solder extractor as claimed in claim 1, wherein said temperature sensing means is coaxially disposed about said hollow tip.

3. The solder extractor as claimed in claim 1, wherein said temperature sensing means comprises a variable resistance element.

4. The solder extractor as claimed in claim 3, wherein said variable resistance element has increased resistance to the flow of electric current at increased temperatures.

5. The solder extractor as claimed in claim 1, wherein said insulation means is coaxially disposed about said tip.

6. In a solder extractor comprising an elongated heat generating assembly having a longitudinal axis, a forward end, a rearward end and an axial therethrough extending along said longitudinal axis and a hollow tubular desoldering tip coaxially received within said axial passageway and extending forwardly from said forward end, the improvement comprising resilient retention means, disposed within said axial passageway intermediate said hollow tubular desoldering tip and said heat generating element, for heat conductively connecting said heat generating element and said tip and generating frictional force to inhibit relative movement between said heat generating element and said tip.

7. The solder extractor as claimed in claim 6, wherein said resilient retention means comprises a plurality of resilient members disposed symmetrically about the outer periphery of said tip.

8. The solder extractor as claimed in claim 7, wherein four resilient members are disposed about the outer periphery of said tip.

9. The solder extractor as claimed in claim 8, wherein each of said resilient members is formed as an angular sector of a hollow cylinder, at least a portion of said member having a radius of curvature less than one-half the outer diameter of said tip.

10. The solder extractor as claimed in claim 7, wherein each resilient member is provided with first detent members to prevent axial movement of said resilient member inwardly of said axial passageway.

11. The solder extractor as claimed in claim 10, wherein each resilient member is provided with second detent means to prevent axial movement of said resilient member outwardly of said axial passageway.

12. The solder extractor as claimed in claim 6, further comprising a detent means located within said axial passageway for limiting the length of said tip which may be inserted into said passageway, said detent means including an annular groove.

13. The solder extractor as claimed in claim 12, wherein said resilient retention means comprises four resilient members disposed symmetrically about the outer periphery of said tip.

14. The solder extractor as claimed claim 11, wherein each resilient member is formed substantially as an angular sector of a hollow cylinder of uniform thickness; said angular sector including first and second longitudinal portions each having a radius of curvature substantially equal to one-half the diameter of said tip and, intermediate said first and second portions, a third longitudinal portion having a radius of curvature less than one-half the diameter of said tip; a first flange portion extending upwardly from the free end of said first longitudinal portion, said first flange portion abuttingly engageable with the front face of said heat generating assembly; a second flange portion extending downwardly from the free end of said second longitudinal portion, said second flange portion receivingly engageably with said annular groove of said detent means.

15. In combination a replaceable tip for a solder extractor and an elongated heat generating assembly for a solder extractor, said heat generating assembly having a longitudinal axis, a forward end, a rearward end and a first axial passageway therethrough extending along said longitudinal axis, said first axial passageway coaxially receivable of the tip and being provided with a detent means for limiting the extent to which said tip may be inserted into said passageway, said detent means having a passage therethrough, said passage communicating with vacuum means for applying a vacuum to said passage for drawing molten solder therethrough, the tip comprising a hollow tubular member having an outer periphery, a first portion heat conductively receivable within said axial first passageway and a second portion extending forwardly therefrom; said first portion, at the free end thereof, being provided with vacuum seal means for engagement with said detent means in a substantially air-tight seal, whereby upon application of a vacuum to said passage through said detent means substantially no leakage occurs about the outer periphery of said tip.

16. The combination as claimed in claim 15, wherein said vacuum seal means comprises a chamber formed on the free end of said first portion, said chamber corresponding to a counterbore formed in said detent means and communicating with said passage through said detent means.

* * * * *